United States Patent
Yamamoto et al.

(10) Patent No.: US 8,309,887 B2
(45) Date of Patent: Nov. 13, 2012

(54) ARC-WELDING TORCH, WEAR DETECTION SYSTEM FOR POWER SUPPLY PORTION OF CONTACT TIP, AND WEAR DETECTION METHOD FOR CONTACT TIP

(75) Inventors: Akiyoshi Yamamoto, Toyota (JP);
Yoshiharu Isoshima, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 356 days.

(21) Appl. No.: 12/677,064

(22) PCT Filed: Sep. 5, 2008

(86) PCT No.: PCT/JP2008/066482
§ 371 (c)(1),
(2), (4) Date: Mar. 25, 2010

(87) PCT Pub. No.: WO2009/031704
PCT Pub. Date: Mar. 12, 2009

(65) Prior Publication Data
US 2011/0006045 A1    Jan. 13, 2011

(30) Foreign Application Priority Data
Sep. 7, 2007   (JP) ................. 2007-232867

(51) Int. Cl.
*B23K 9/28*   (2006.01)

(52) U.S. Cl. ............... 219/137.61; 219/125.1; 219/136

(58) Field of Classification Search ............. 219/137.61, 219/125.1, 130.21, 137.7, 136
See application file for complete search history.

(56) References Cited

U.S. PATENT DOCUMENTS 6,943,318 B2 *   9/2005   Takagi et al. ............ 219/137.61
7,262,386 B2 *   8/2007   Matthews et al. ........ 219/137.61

FOREIGN PATENT DOCUMENTS

| JP | 5-269580 A | 10/1993 |
| JP | 7-15163 U | 3/1995 |
| JP | 8-318372 A | 12/1996 |
| JP | 11-10338 A | 1/1999 |
| JP | 2002-011578 A | 1/2002 |

* cited by examiner

*Primary Examiner* — David Lam
(74) *Attorney, Agent, or Firm* — Kenyon & Kenyon LLP

(57) ABSTRACT

A welding torch includes: a contact tip having, on a distal-end inner circumferential surface thereof, a power supply portion that contacts a fed welding wire to supply current; and a wire guide that is provided having a predetermined clearance within the contact tip and guides the fed welding wire, and wherein the arc-welding torch is configured such that axes of the contact tip and the wire guide are relatively changed so as to cause the welding wire fed while guided by the wire guide to contact the power supply portion of the contact tip. The power supply portion of the contact tip is formed to have an axial length with which a welding current can be maintained at least a predetermined lower limit current despite a shift of a power supply point in accordance with wear of the power supply portion, more specifically, formed to have a length of 1 to 4 mm.

8 Claims, 6 Drawing Sheets

F I G. 1
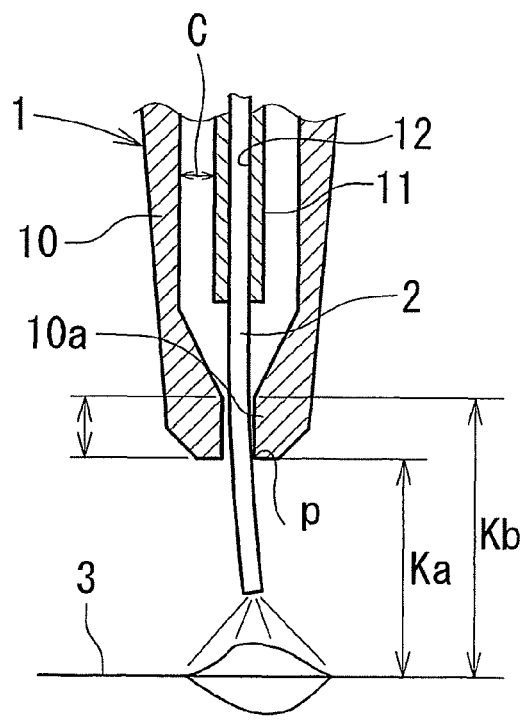
F I G. 2
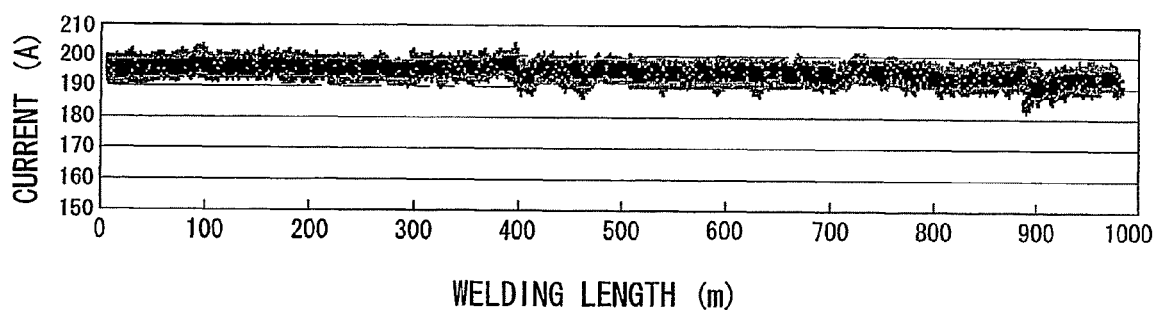

PRIOR ART

ARC-WELDING TORCH, WEAR DETECTION SYSTEM FOR POWER SUPPLY PORTION OF CONTACT TIP, AND WEAR DETECTION METHOD FOR CONTACT TIP

This is a 371 national phase application of PCT/JP2008/066482 filed 5 Sep. 2008, claiming priority to Japanese Patent Application No. 2007-232867 filed 7 Sep. 2007, the contents of which are incorporated herein by reference.

FIELD OF THE INVENTION

The present invention relates to an arc-welding torch, a wear detection system for a power supply portion of a contact tip, and a wear detection method for a contact tip. More specifically, the present invention relates to an arc-welding torch which includes: a contact tip having, on a distal-end inner circumferential surface thereof, a power supply portion that contacts a fed welding wire to supply current; and a wire guide that is provided having a predetermined clearance within the contact tip and guides the fed welding wire, wherein the arc-welding torch is configured such that axes of the contact tip and the wire guide are relatively changed so as to cause the welding wire guided by the wire guide to contact the power supply portion of the contact tip. The present invention further relates to a wear detection system for a power supply portion of a contact tip of an arc-welding torch, the arc-welding torch including: a contact tip having, on a distal-end inner circumferential surface thereof, a power supply portion that contacts a fed welding wire to supply current; and a wire guide that is provided having a predetermined clearance within the contact tip and guides the fed welding wire, wherein the arc-welding torch is configured such that axes of the contact tip and the wire guide are relatively changed so as to cause the welding wire guided by the wire guide to contact the power supply portion of the contact tip. The present invention yet further relates to a method for detecting wear of a power supply portion of a contact tip of an arc-welding torch.

BACKGROUND OF THE INVENTION

Arc welding is a technique in which electric power is supplied via a torch to a welding wire that is continuously fed to generate arc discharge between the welding wire and an object to be welded, so that the welding wire and a part of the object to be welded are melted and bonded together by the heat energy of the arc discharge. Art described in Patent Document 1 is known as related art associated with a torch used for such arc welding.

Patent Document 1 describes an arc-welding torch including: a wire feeding portion that bends a welding wire to a predetermined curvature to feed it; and a power supply torch portion that is provided continuous to the wire feeding portion and supplies electric power via a contact tip to the welding wire fed from the wire feeding portion. The arc-welding torch is characterized in that the power supply torch portion includes a guide cylinder that guides the welding wire substantially linearly to feed it to the contact tip.

Further, among such arc-welding torches, an arc-welding torch is known that includes: a contact tip 10' having, on a distal-end inner circumferential surface thereof, a power supply portion 10a' that contacts a fed welding wire 2 to supply current; and a wire guide 11' that is provided having a predetermined clearance within the contact tip 10' and guides the fed welding wire 2, as shown in FIG. 8. The arc-welding torch is configured such that axes of the contact tip 10' and the wire guide 11' are relatively changed so as to cause the welding wire 2 guided by the wire guide 11' to contact the power supply portion 10a' of the contact tip 10'. The arc-welding torch is also configured such that inert gas is supplied to a flow path formed between an outer side of the contact tip 10' and a nozzle 13' and is blown to the welded portion. In such an arc-welding torch 1', the wire guide 11' guides the welding wire 2. Therefore, it is possible to accurately feed the welding wire 2 to a welding site. Moreover, the axes of the contact tip 10' and the wire guide 11' are relatively changed so as to cause the welding wire 2 guided by the wire guide 11' to press-contact the power supply portion 10a' of the contact tip 10'. Therefore, current can be securely supplied to the welding wire 2. The contact tip 10' of such an arc-welding torch 1' is generally formed such that, when the welding wire 2 has a diameter of 1.2 mm for example, the power supply portion 10a' has an axial length La' of 8.7 to 11.1 mm as shown in FIG. 9A, in order to securely contact the power supply portion 10a' to the welding wire 2.

In the arc-welding torch 1', when the contact tip 10' is new, a power supply point P is generally set at a distal end of the power supply portion 10a' of the contact tip 10' on a base material 3 side, in order to supply current to the welding wire 2 as efficiently as possible (see FIG. 9A). However, since the welding wire 2 is fed while contacting the power supply portion 10a' of the contact tip 10', the power supply portion 10a' wears as shown in FIG. 9B. As a result, a position at which the welding wire 2 contacts the power supply portion 10a' (this position is referred to as the power supply point P) shifts backward from the distal end of the contact tip 10' (in a direction opposite to the feeding direction of the welding wire).

Here, a change in the welding current in accordance with a change in the distance between the power supply point P and the base material 3 from Ka' to Kb' will be described, based on FIG. 10. The graph in FIG. 10 shows the relationship between the welding current and the distance between the distal end of the contact tip 10' and the base material 3 that has changed from L1 to L2 (i.e., the distance between the power supply point P and the base material 3 that has changed from Ka' to Kb'), assuming that the power supply point P of the welding wire 2 having a diameter of 1.2 mm is always located at the distal end of the power supply portion 10a' of the contact tip 10' on the base material 3 side. It is clear from the graph that, with an increase in the distance between the distal end of the contact tip 10' and the base material 3, the length of the welding wire 2 through which the current from the power supply point P flows also increases. Thus, electrical resistance increases accordingly, thereby decreasing the welding current. In the case shown in FIG. 10, when the distance between the distal end of the contact tip 10' and the base material 3 increases by 3 mm from L1 (=15 mm) to L2 (=18 mm), the welding current falls by 20 A from approximately 177 A to 157 A. If the welding current falls at least 20 A due to wear of the contact tip 10' as described above, welding defects such as incomplete penetration, insufficient leg length or throat thickness, and the like may occur.

The contact tip 10' wears after use for a predetermined length of welding, and thus, the initial welding current falls to no more than a predetermined lower limit current (a minimum current required for maintaining welding quality, that differs depending on welding conditions). In the case shown in FIG. 11, at the welding length of 21 m indicated by an arrow where the welding current falls from the initial current of 187 A to 157 A, values fall below the predetermined lower limit current in this case.

Therefore, in the related art, the production in the welding process is temporarily stopped before the welding current falls below the predetermined lower limit current, i.e., at 16 m, which is 5 m before the welding length reaches 21 m (see the vertical line affixed with an arrow in FIG. 11), and the contact tip 10' is periodically replaced at short intervals. If the periodical replacement cannot be appropriately conducted, welding sites are inspected in order to prevent welding defects, and any welding defect found in the inspection is repaired.

Patent Document 1: Japanese Patent Application Publication No. JP-A-05-269580

SUMMARY OF THE INVENTION

Problems to be Solved by the Invention

As described above, when the contact tip 10' having the power supply portion 10a' that is formed to have an axial length of 8.7 to 11.1 mm is used, the power supply point P moves within the axial length of the power supply portion 10a' due to wear of the power supply portion 10a', causing welding defects. Therefore, it is necessary to periodically stop the welding operation to replace the contact tip 10' based on the predicted wear amount, regardless of the physical wear amount limit in a direction perpendicular to the axis of the power supply portion 10a'. Thus, the cost of the contact tip 10' increases. Moreover, the welding process must be stopped for replacement of the contact tip 10'. Furthermore, if periodical replacement cannot be appropriately performed, it is necessary to inspect welding sites in order to prevent welding defects, and any welding defect found in the inspection must be repaired. Thus, productivity cannot be improved.

Further, the contact tip 10' approaches the wire guide 11' with wear of the power supply portion 10a'. Then, when the inner side of the contact tip 10' contacts the outer circumferential surface of the wire guide 11', the contact point becomes the power supply point P. However, since the power supply point P is positioned rearward of the power supply portion 10a' of the contact tip 10', the electrical resistance increases and therefore, the welding current sharply drops. This has significant adverse effects on the welding quality. When the wire guide 11' and the contact tip 10' are close to each other, a spark may be generated between the outer circumferential surface of the wire guide 11' and the inner circumferential surface of the contact tip 10', whereby the wire guide 11' and the contact tip 10' may adhere to each other. When the wire guide 11' and the contact tip 10' adhere to each other as described above, the contact tip 10' cannot be removed from the torch main body 1'. Therefore, not only the contact tip 10' and the wire guide 11' but also the entire torch main body 1' must be replaced. This requires time and more costs, and further, productivity cannot be improved because the welding process must be temporarily stopped for replacement of the torch main body 1'.

Having been devised in view of the problems described above, it is an object of the present invention to provide an arc-welding torch, which is configured such that axes of the contact tip and the wire guide are relatively changed so as to cause the welding wire guided by the wire guide to contact the power supply portion of the contact tip. The arc-welding torch allows for a shift of the power supply point in accordance with wear of the power supply portion of the contact tip due to contact with the welding wire. Thus, welding can be appropriately performed. Therefore, the service life can be increased, costs reduced, and productivity improved.

The present invention has been devised in view of the problems described above. It is an object of the present invention to provide a wear detection system for a power supply portion of a contact tip and an arc-welding torch, the arc-welding torch being configured such that axes of the contact tip and the wire guide are relatively changed so as to cause the welding wire guided by the wire guide to contact the power supply portion of the contact tip. The wear detection system detects in advance wear of the power supply portion of the contact tip, due to contact with the welding wire, to such a degree that a spark is generated between the power supply portion and the wire guide, thereby securely preventing such an occurrence. Thus, the service life can be increased, costs reduced, and productivity improved.

The present invention has been devised in view of the problems described above. It is an object of the present invention to provide a wear detection method for a contact tip of an arc-welding torch, the arc-welding torch being configured such that axes of the contact tip and the wire guide are relatively changed so as to cause the welding wire guided by the wire guide to contact the power supply portion of the contact tip. The wear detection method can securely detect in advance wear of the power supply portion of the contact tip, due to contact with the welding wire, to such a degree that a spark is generated between the power supply portion and the wire guide, thereby securely preventing such an occurrence. Thus, the service life can be increased, costs reduced, and productivity improved.

Means for Solving the Problems

In order to achieve the above objects, the invention of an arc-welding torch according to claim 1 includes: a contact tip having, on a distal-end inner circumferential surface thereof, a power supply portion that contacts a fed welding wire to supply current; and a wire guide that is provided having a predetermined clearance within the contact tip and guides the fed welding wire. The arc-welding torch is configured such that axes of the contact tip and the wire guide are relatively changed so as to cause the welding wire guided by the wire guide to contact the power supply portion of the contact tip. The arc-welding torch is characterized in that the power supply portion of the contact tip is formed to have an axial length with which a welding current is maintained at least a predetermined lower limit current despite a shift of a power supply point in accordance with wear of the power supply portion.

In order to achieve the above objects, the invention of an arc-welding torch according to claim 2 based on the invention according to claim 1 is characterized in that the axial length of the power supply portion of the contact tip is 1.5 to 3.0 mm.

In order to achieve the above objects, the invention of an arc-welding torch according to claim 3 includes: a contact tip having, on a distal-end inner circumferential surface thereof, a power supply portion that contacts a fed welding wire to supply current; and a wire guide that is provided having a predetermined clearance within the contact tip and guides the fed welding wire. The arc-welding torch is configured such that axes of the contact tip and the wire guide are relatively changed so as to cause the welding wire guided by the wire guide to contact the power supply portion of the contact tip. The arc-welding torch is characterized by including a wear-contact portion where the wear-contact portion is provided rearward of the power supply portion on an inner circumferential surface of the contact tip and has an inner diameter larger than the one of the power supply portion so as to contact to the welding wire at a wear limit before a spark generates as an outer circumferential surface of the wire guide approaches an inner circumferential surface of the contact tip when the power supply portion has worn, and the wear-contact portion also has an axial length allowing that welding current falls below a predetermined lower limit current when a power supply point shifts rearward.

In order to achieve the above objects, the invention of an arc-welding torch according to claim 4 based on the invention according to claim 3 is characterized in that the power supply portion of the contact tip is foamed to have an axial length with which a welding current is maintained at least a predetermined lower limit current despite a shift of a power supply point in accordance with wear of the power supply portion.

In order to achieve the above objects, the invention of an arc-welding torch according to claim 5, based on the invention according to claim 4, is characterized in that the axial length of the power supply portion of the contact tip is 1.5 to 3.0 mm.

In order to achieve the above objects, the invention of an arc-welding torch according to claim 6 based on the arc-welding torch according to any one of claims 3 to 5 is characterized by further including: current detection means that detects current supplied to the contact tip; and determination means that determines, when current detected by the current detection means has been detected as falling below a predetermined lower limit, that the welding wire contacts the wear-contact portion and the power supply portion of the contact tip has worn.

In order to achieve the above objects, the invention of a wear detection system for a power supply portion of a contact tip of an arc-welding torch according to claim 7 is a system for detecting wear of a power supply portion of a contact tip of an arc-welding torch, the arc-welding torch including: a contact tip having, on a distal-end inner circumferential surface thereof, a power supply portion that contacts a fed welding wire to supply current; and a wire guide that is provided having a predetermined clearance within the contact tip and guides the fed welding wire, wherein the arc-welding torch is configured such that axes of the contact tip and the wire guide are relatively changed so as to cause the welding wire guided by the wire guide to contact the power supply portion of the contact tip. The wear detection system is characterized by including: a wear-contact portion where the wear-contact portion is provided rearward of the power supply portion on an inner circumferential surface of the wire guide and has an inner diameter larger than the one of the power supply portion so as to contact to the welding wire at a wear limit before a spark generates as an outer circumferential surface of the wire guide approaches an inner circumferential surface of the contact tip when the power supply portion has worn, and the wear-contact portion also has an axial length allowing that welding current falls below a predetermined lower limit current when a power supply point shifts rearward; current detection means that detects current supplied to the contact tip; and determination means that determines, when current detected by the current detection means has been detected as falling below a predetermined lower limit, that the welding wire contacts the wear-contact portion and the power supply portion of the contact tip has worn.

In order to achieve the above objects, the invention of a wear detection method for a contact tip according to claim 8 is a method for detecting wear of a power supply portion of a contact tip in an arc-welding torch, the arc-welding torch including: a contact tip having, on a distal-end inner circumferential surface thereof, a power supply portion that contacts a fed welding wire to supply current; and a wire guide that is provided having a predetermined clearance within the contact tip and guides the fed welding wire, wherein the arc-welding torch is configured such that axes of the contact tip and the wire guide are relatively changed so as to cause the welding wire guided by the wire guide to contact the power supply portion of the contact tip. The wear detection method is characterized by forming: a wear-contact portion where the wear-contact portion is provided rearward of the power supply portion that connects the welding wire of the contact tip and has an inner diameter larger than the one of the power supply portion so as to contact to the welding wire at a wear limit before a spark generates as an outer circumferential surface of the wire guide approaches an inner circumferential surface of the contact tip when the power supply portion has worn, and the wear-contact portion also has an axial length allowing that welding current falls below a predetermined lower limit current when a power supply point shifts rearward; detecting current supplied to the contact tip; and detecting wear of the power supply portion of the contact tip when the current has been detected as falling below the predetermined lower limit.

Effects of the Invention

According to the invention of claim 1, in the arc-welding torch configured such that axes of the contact tip and the wire guide are relatively changed so as to cause the welding wire guided by the wire guide to contact the power supply portion of the contact tip, the power supply portion of the contact tip is formed to have an axial length with which welding current is maintained at least a predetermined lower limit current despite a shift of a power supply point in accordance with wear of the power supply portion. Therefore, it is possible to provide an arc-welding torch that can appropriately perform welding by allowing for a shift of the power supply point in accordance with wear of the power supply portion of the contact tip due to contact with the welding wire.

According to the invention of claim 2, based on the invention according to claim 1, the axial length of the power supply portion of the contact tip is 1.5 to 3.0 mm. Therefore, it is possible to realize appropriate welding by allowing for a shift of the power supply point in accordance with wear of the power supply portion of the contact tip due to contact with the welding wire.

According to the invention of claim 3, in the arc-welding torch configured such that axes of the contact tip and the wire guide are relatively changed so as to cause the welding wire guided by the wire guide to contact the power supply portion of the contact tip, it is determined that the welding wire contacts the wear-contact portion when the current has been detected as falling below a predetermined lower limit. Therefore, it is possible to provide an arc-welding torch that detects in advance wear of the power supply portion of the contact tip, due to contact with the welding wire, to such a degree that a spark is generated between the power supply portion and the wire guide, thereby securely preventing such an occurrence. Note that warning means or stop control means may be provided that issues a warning or stops welding equipment when the determination means determines that the power supply portion has worn.

According to the invention of claim 4, based on the invention according to claim 3, the power supply portion of the contact tip is fanned to have an axial length with which welding current is maintained at least a predetermined lower limit current despite a shift of a power supply point in accordance with wear of the power supply portion. Therefore, it is possible to appropriately perform welding by allowing for a shift of the power supply point in accordance with wear of the power supply portion of the contact tip due to contact with the welding wire.

According to the invention of claim 5, based on the invention according to claim 4, the axial length of the power supply portion of the contact tip is 1.5 to 3.0 mm. Therefore, it is possible to realize appropriate welding by allowing for a shift of the power supply point in accordance with wear of the power supply portion of the contact tip due to contact with the welding wire until the power supply portion of the contact tip wears and a warning is issued.

According to the invention of claim 6, based on the invention according to any one of claims 3 to 5, the arc-welding torch further includes: current detection means that detects current supplied to the contact tip; and determination means that determines, when current detected by the current detection means has been detected as falling below a predetermined lower limit, that the welding wire contacts the wear-contact portion and the power supply portion of the contact tip has worn. Thus, the current detection means detects that the welding wire contacts the wear-contact portion when current detected by the current detection means has been detected as falling below the predetermined lower limit, and the determination means determines that the power supply portion of the contact tip wears. Therefore, it is possible to provide an arc-welding torch that detects in advance wear of the power supply portion of the contact tip, due to contact with the welding wire, to such a degree that a spark is generated between the power supply portion and the wire guide, thereby securely preventing such an occurrence.

According to the invention of claim 7, the arc-welding torch includes: a contact tip having, on a distal-end inner circumferential surface thereof, a power supply portion that contacts a fed welding wire to supply current; and a wire guide that is provided having a predetermined clearance within the contact tip and guides the fed welding wire. The arc-welding torch is configured such that axes of the contact tip and the wire guide are relatively changed so as to cause the welding wire guided by the wire guide to contact the power supply portion of the contact tip. The wear detection system for a power supply portion of a contact tip is configured to include: a wear-contact portion where the wear-contact portion is provided rearward of the power supply portion on the inner circumferential surface of the contact tip and has an inner diameter larger than the one of the power supply portion so as to contact to the welding wire at a wear limit before a spark generates as an outer circumferential surface of the wire guide approaches an inner circumferential surface of the contact tip when the power supply portion has worn, and the wear-contact portion also has an axial length allowing that welding current falls below a predetermined lower limit current when a power supply point shifts rearward; current detection means that detects current supplied to the contact tip; and determination means that determines, when current detected by the current detection means has been detected as falling below s predetermined lower limit, that the welding wire contacts the wear-contact portion and the power supply portion of the contact tip has worn. Therefore, it is possible to provide a wear detection system for a power supply portion of a contact tip of an arc-welding torch that detects in advance wear of the power supply portion of the contact tip, due to contact with the welding wire, to such a degree that a spark is generated between the power supply portion and the wire guide, thereby securely preventing such an occurrence.

According to the invention of claim 8, the arc-welding torch is configured such that axes of the contact tip and the wire guide are relatively changed so as to cause the welding wire guided by the wire guide to contact the power supply portion of the contact tip. The wear-contact portion is provided rearward of the power supply portion that contacts the welding wire of the contact tip and has an inner diameter larger than the one of the power supply portion so as to contact to the welding wire at a wear limit before a spark generates as an outer circumferential surface of the wire guide approaches an inner circumferential surface of the contact tip when the power supply portion has worn, and the wear-contact portion also has an axial length allowing that welding current falls below a predetermined lower limit current when a power supply point shifts rearward. Thus, current supplied to the contact tip is detected, and wear of the power supply portion is detected based on a change in the detected current. Therefore, it is possible to provide a wear detection method for a contact tip that can securely detect in advance wear of the power supply portion of the contact tip, due to contact with the welding wire, to such a degree that a spark is generated between the power supply portion and the wire guide.

BRIEF DESCRIPTION OF THE DRAWINGS

FIG. 1 is a sectional view showing a main part of a first embodiment of an arc-welding torch according to the present invention.

FIG. 2 is a graph for explaining a change in current with the use of the welding torch according to the first embodiment of the present invention.

DESCRIPTION OF THE REFERENCE NUMERALS

Figure 3:
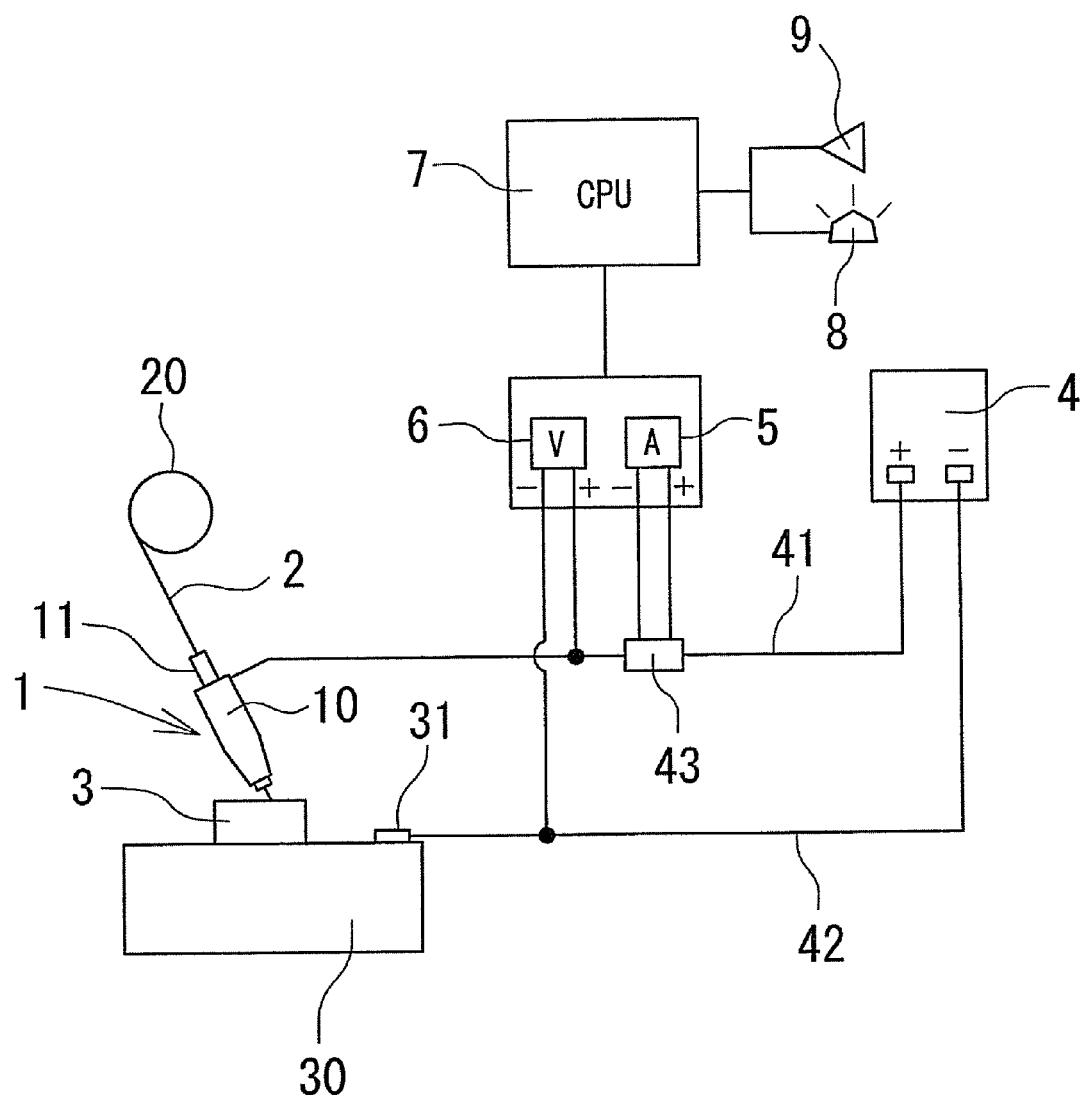
FIG. 3 is a conceptual view showing a second embodiment of the arc-welding torch according to the present invention.

1: WELDING TORCH, 2: WELDING WIRE, 3: BASE MATERIAL, 5: AMMETER (CURRENT DETECTION MEANS), 7: CONTROL COMPUTER (DETERMINATION MEANS), 10: CONTACT TIP, 10$a$: POWER SUPPLY PORTION, 10$b$: WEAR-CONTACT PORTION, 11: WIRE GUIDE

DETAILED DESCRIPTION

A first embodiment of an arc-welding torch 1 according to the present invention will be first described in detail, based on FIGS. 1 and 2. In the drawings, like reference numerals indicate like or corresponding portions.

In brief, the arc-welding torch 1 according to the present invention includes: a contact tip 10 having, on a distal-end inner circumferential surface thereof, a power supply portion 10*a* that contacts a fed welding wire 2 to supply current; and a wire guide 11 that is provided having a predetermined clearance within the contact tip 10 and guides the fed welding wire 2. The arc-welding torch 1 is configured such that axes of the contact tip 10 and the wire guide 11 are relatively changed so as to cause the welding wire 2 fed while guided by the wire guide 11 to contact the power supply portion 10*a* of the contact tip 10. The power supply portion 10*a* of the contact tip 10 is formed to have an axial length La with which a welding current is maintained at least a predetermined lower limit current despite a shift of a power supply point P in accordance with wear of the power supply portion 10*a*, more specifically, formed to have a length of 1 to 4 mm.

The wire guide 11 is provided, at the center thereof, with a hole 12 for inserting the welding wire 2 that extends in the axial direction. A base end portion of the wire guide 11 is attached to the torch main body 1 via an insulator, which is supported by a robot arm or the like. The wire guide 11 guides the fed welding wire 2 to a target position of a welding site, using a driving force of a feed motor or the like.

The contact tip 10 is formed from conductive material. The contact tip 10 is formed into a hollow cylindrical shape and has a predetermined clearance C that is formed between an inner circumferential surface thereof and an outer circumferential surface of the wire guide 11. The power supply portion 10*a* is formed on the distal-end inner circumferential surface of the contact tip 10, and contacts the welding wire 2 to supply current to the welding wire 2. A base end portion or an intermediate portion of the contact tip 10 is rotatably supported by means of a shaft, and the contact tip 10 is biased by a spring or the like such that the power supply portion 10*a* is pressed with a predetermined strength against the welding wire 2 fed from a distal end of the wire guide 11. Electrodes of a DC power supply 4 are connected to the contact tip 10 and a base material 3.

As shown in FIG. 1, the power supply portion 10*a* of the contact tip 10 is formed to have the axial length La of 1 to 4 mm, more preferably, 1.5 to 3.0 mm, in the present embodiment. Therefore, at the beginning of use, the welding wire 2 is in contact with a lower end of the power supply portion 10*a* shown in FIG. 1. Accordingly, the power supply point P is positioned at the distal end of the contact tip 10, and the distance between the power supply point P and the base material 3 is Ka. The welding current at this time is 190 to 200 A (amperes) as shown in FIG. 2, for example.

With the use of the welding torch 1 (i.e., as the welding length increases), the power supply portion 10*a* of the contact tip 10 wears because the welding wire 2 is fed while pressed against the power supply portion 10*a*. However, even if the power supply portion 10*a* wears, the power supply point P only shifts to an upper end of the power supply portion, that is, within a range of 1 to 4 mm, which is the axial length La of the power supply portion 10*a*, and more preferably, 1.5 to 3.0 mm, in the present embodiment. Thus, even if the power supply portion 10*a* wears, the distance between the power supply point P and the base material 3 is Kb=Ka+1 to 4 mm. Consequently, the welding current falls due to the shift of the power supply point P, but does not fall below the predetermined lower limit current at which welding defects may occur. Thus, it is possible to appropriately perform welding and secure the welding quality. Further, as shown in FIG. 2, even when the welding length increases, a drop in the welding current can be suppressed, thereby increasing the service life of the contact tip 10. Therefore, replacement of the contact tip 10 is less frequently required, whereby costs can be reduced and productivity improved.

Next, a second embodiment of the arc-welding torch according to the present invention and a wear detection system for the power supply portion of the contact tip of the arc-welding torch will be described in detail, based on FIGS. 3 to 5. Note that, in the present embodiment, like reference numerals are assigned to portions like or corresponding to those in the above embodiment. Description of such portions will be omitted, and only different portions described.

In brief, the arc-welding torch 1 according to the present invention includes: a contact tip 10 having, on a distal-end inner circumferential surface thereof, a power supply portion 10*a* that contacts a fed welding wire 2 to supply current; and a wire guide 11 that is provided having a predetermined clearance within the contact tip 10 and guides the fed welding wire 2. The arc-welding torch 1 is configured such that axes of the contact tip 10 and the wire guide 11 are relatively changed so as to cause the welding wire 2 guided by the wire guide 11 to contact the power supply portion 10*a* of the contact tip 10. The arc-welding torch 1 further includes a wear-contact portion 10*b* that is formed rearward of the power supply portion 10*a* on the inner circumferential surface of the contact tip 10 and contacts the welding wire 2 when the power supply portion 10*a* wears. The wear detection system for the power supply portion of the contact tip of the arc-welding torch 1 includes: current detection means 5 that detects current supplied to the contact tip 10; determination means 7 that determines, based on a change in current detected by the current detection means 5, that the welding wire 2 contacts the wear-contact portion 10*b* and the power supply portion 10*a* of the contact tip 10 has worn; and warning means 8, 9 that issue a warning when the determination means 7 determines that the power supply portion 10*a* has worn.

As in the case of the above embodiment, the welding torch 1 is attached to a robot arm or the like and moved along a welding site of the base material 3. The welding wire 2 is wound around a roll 20, but the curl is straightened before the welding wire 2 is inserted into the hole 12 of the wire guide 11 via a feeding mechanism from the rear of the welding torch 1. Then, the welding wire 2 is guided from the distal end to a target position of the welding site and fed at a predetermined speed.

The base material 3 is positioned and fixed on a jig 30, and the jig 30 is grounded via an earth 31 that is conductive with the base material 3. One electrode of the power supply 4 is connected to the contact tip 10 of the welding torch 1, while the other electrode is connected to the base material 3 via the earth 31. An ammeter 5 is connected via a shunt resistor 43 to a cable 41 that connects the one electrode of the power supply 4 and the contact tip 10. Further, a voltmeter 6 is connected to the cable 41 that connects the one electrode of the power supply 4 and the contact tip 10, and to a cable 42 that connects the other electrode of the power supply 4 and the earth 31. Detection results of the ammeter 5 and the voltmeter 6 are input to a control computer 7. Connected to the control computer 7 are a warning lamp 8 and a warning speaker 9 that serve as warning means for issuing a warning.

The contact tip 10 is formed from conductive material, as in the case of the above embodiment. The contact tip 10 is formed into a hollow cylindrical shape and has a predetermined clearance C that is formed between the inner circumferential surface thereof and the outer circumferential surface of the wire guide 11. A base end portion or an intermediate portion of the contact tip 10 is rotatably supported by means of a shaft, and the contact tip 10 is biased by a spring or the like such that the power supply portion 10*a* is pressed with a predetermined strength against the welding wire 2 fed from the distal end of the wire guide 11. The power supply portion 10a is formed on the distal-end inner circumferential surface of the contact tip 11, and contacts the welding wire 2 to supply current to the welding wire 2. Further, the contact tip 10 of the present embodiment includes the wear-contact portion 10b that is formed rearward of the power supply portion 10a (to the right of the power supply portion 10a in FIGS. 4 and 5), and has an inner diameter larger than that of the power supply portion 10a.

The axial length La of the power supply portion 10a may be set within 1 to 4 mm, more preferably 1.5 to 3.0 mm, as in the case of the above embodiment, but is set to 2.0 mm in the present embodiment.

Figure 5:
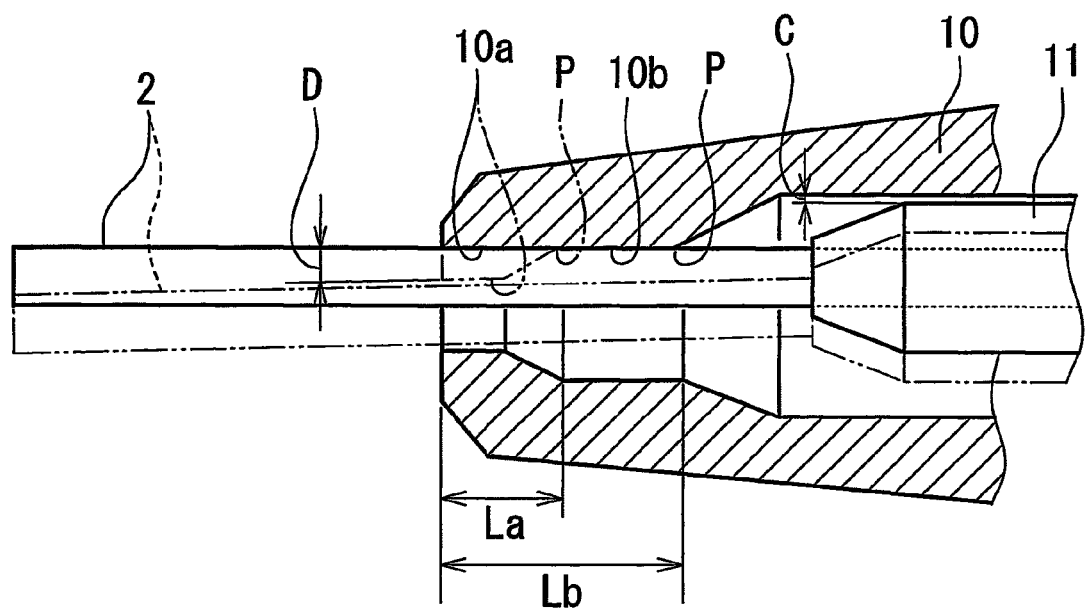
FIG. 5 is an enlarged sectional view for explaining a state in which a contact tip of the arc-welding torch according to the present invention has worn.

As shown in FIG. 5, the wear-contact portion 10b has an inner diameter that is set such that, when the power supply portion 10a wears, the wear-contact portion 10b contacts the welding wire 2 before the clearance C between the outer circumferential surface of the wire guide 11 and the inner circumferential surface of the contact tip 10 becomes narrow enough to generate a spark (this inner diameter is referred to as a wear limit). At the same time, an axial length Lb is set such that, as the power supply point P shifts rearward, the welding current falls below the predetermined lower limit current (for example, 5.2 mm).

Figure 4:
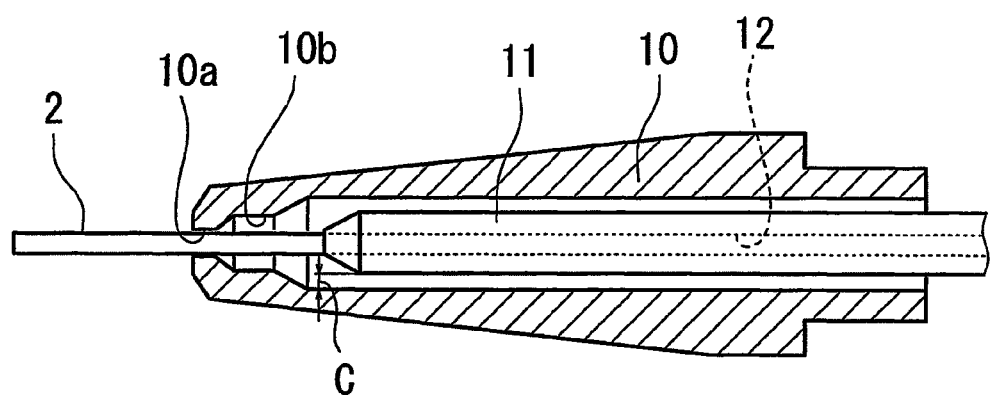
FIG. 4 is a sectional view of a distal end portion of the arc-welding torch according to the present invention.
Figure 6:
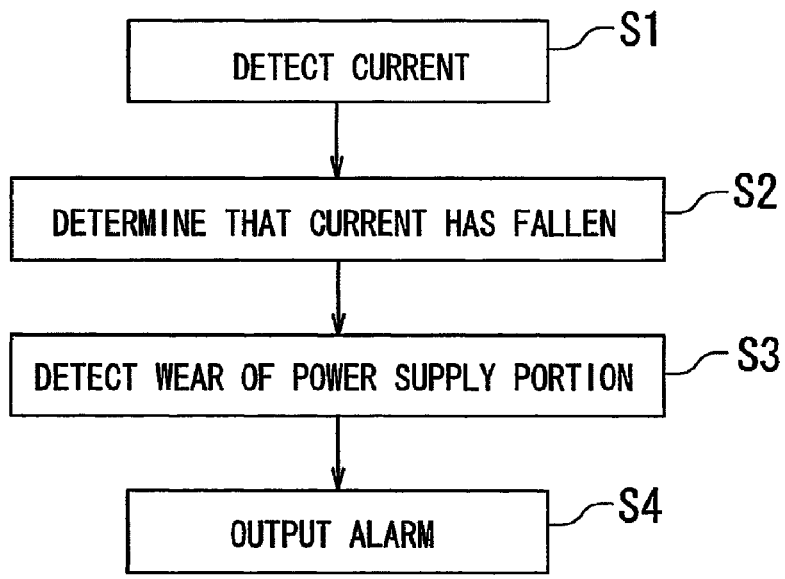
FIG. 6 is a block diagram showing steps for implementing a wear detection method of the contact tip according to the present invention.
Figure 7:
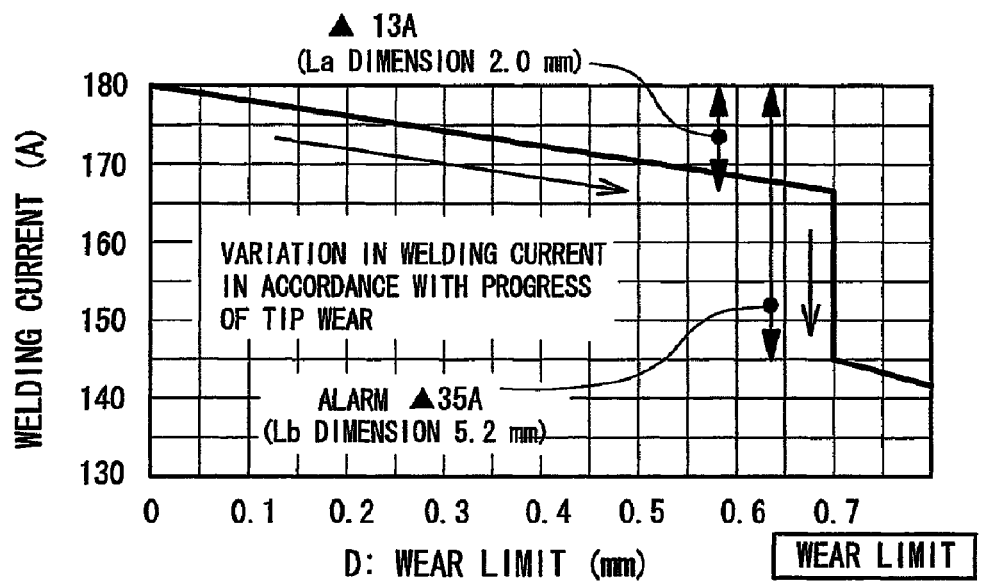
FIG. 7 is a graph for explaining a change in welding current detected by the present invention.
Figure 8:
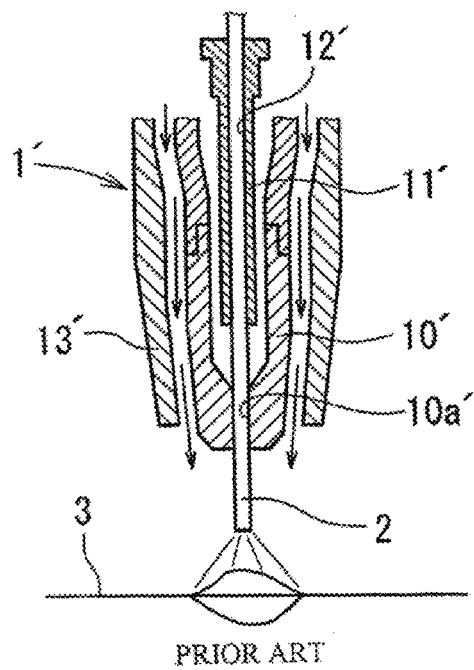
FIG. 8 is an enlarged sectional view of a main part for explaining a general arc-welding torch in related art.
Figure 9A:
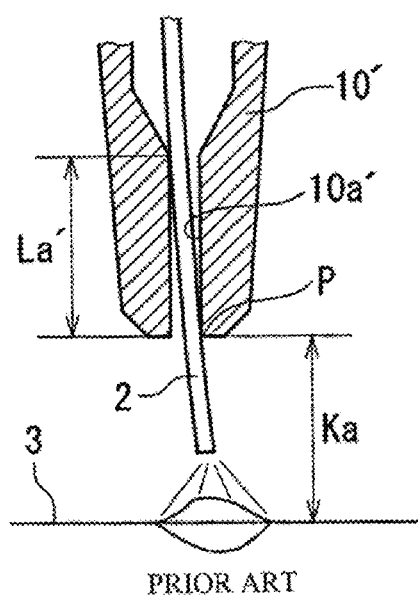
FIG. 9($a$), FIG. 9($b$) are partial, enlarged sectional views for explaining that a power supply point shifts due to wear of the power supply portion in the contact tip according to the related art.
Figure 9B:
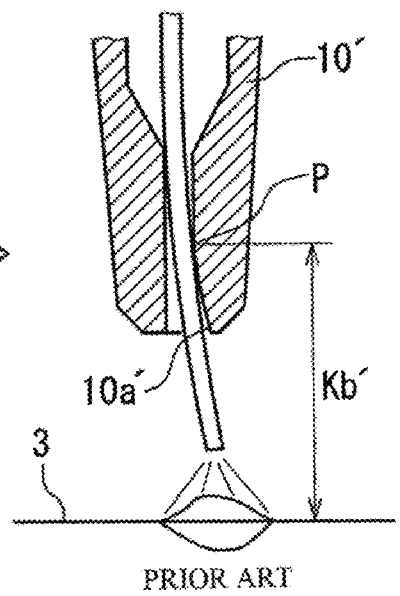
Figure 10:
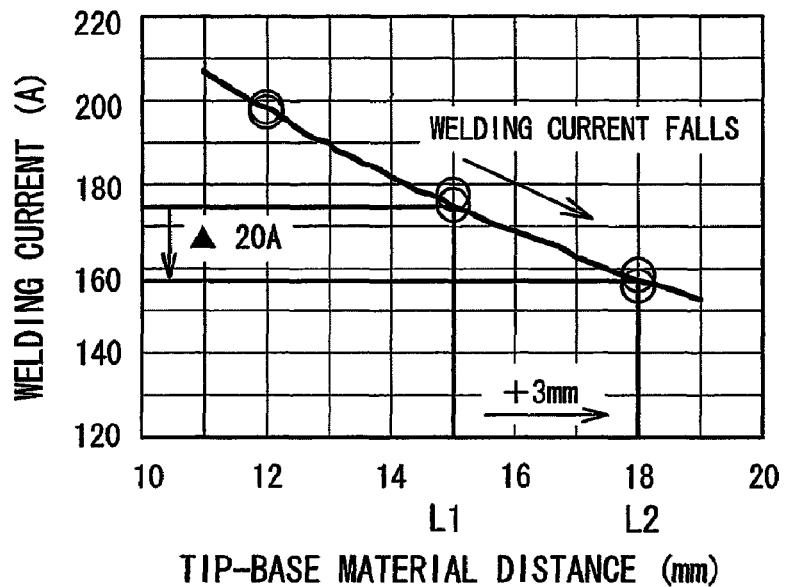
FIG. 10 is a graph for explaining that the power supply point shifts due to wear of the power supply portion and causes the welding current to drop in the contact tip according to the related art.
Figure 11:
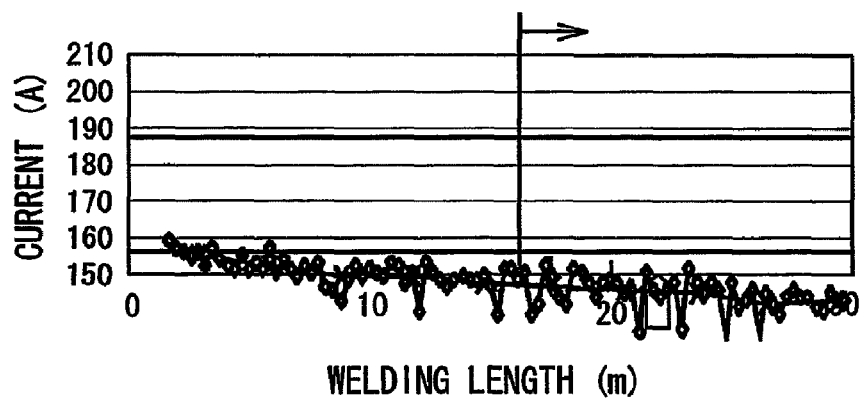
FIG. 11 is a graph for explaining a change in current with the use of the welding torch in the contact tip according to the related art.

Next, a wear detection method and operation thereof according to the present invention using the torch configured as shown in FIGS. 3 to 5 will be described based on FIGS. 6 and 7.

In brief, the wear detection method of a contact tip 10 according to the present invention is a method for detecting wear of a power supply portion 10a of the contact tip 10 in the arc-welding torch 1 which includes: the contact tip 10 having, on a distal-end inner circumferential surface thereof, the power supply portion 10a that contacts a fed welding wire 2 to supply current; and a wire guide 11 that is provided having a predetermined clearance within the contact tip 10 and guides the fed welding wire 2, wherein the arc-welding torch is configured such that axes of the contact tip 10 and the wire guide 11 are relatively changed so as to cause the welding wire 2 guided by the wire guide 11 to contact the power supply portion 10a of the contact tip 10. The wear detection method includes: forming a wear-contact portion 10b that contacts the welding wire 2 when the power supply portion 10a wears rearward of the power supply portion 10a that is in contact with the welding wire 2 of the contact tip 10; detecting current supplied to the contact tip 10; and detecting that the power supply portion 10a of the contact tip 10 has worn based on a change in the detected current.

The contact tip 10 is biased such that the power supply portion 10a contacts the welding wire 2, as in the case of the contact tip 10 of the embodiment shown in FIG. 1. In the contact tip 10, the power supply point P shifts by a small amount until the welding wire 2 contacts the rearward wear-contact portion 10b due to wear of the power supply portion 10a (see chain lines in FIG. 5), and for example, as indicated by the wear dimension D equals 0 to 0.7 mm in FIG. 7, the welding current does not fall below a predetermined lower limit current (i.e., a drop in the current is 13 A in FIG. 7). Therefore, current is supplied from the power supply portion 10a of the contact tip 10 to the welding wire 2 in a stable manner. At this time, as shown in FIG. 6, the ammeter 5 detects the current supplied from the power supply 4 to the contact tip 10 (S1), and detection results are output to the control computer 7. The control computer 7 monitors as to whether the welding current falls below the predetermined lower limit current.

When the power supply portion 10a of the contact tip 10 wears with the use of the welding torch 1, as shown by a solid line in FIG. 5, the welding wire 2 contacts the rearward wear-contact portion 10b at a wear limit before the clearance C between the outer circumferential surface of the wire guide 11 and the inner circumferential surface of the contact tip 10 becomes narrow enough to generate a spark. Thus, the power supply point P shifts rearward, and then, the welding current falls below the predetermined lower limit current, as indicated by the wear dimension of 0.7 mm in FIG. 7 (the welding current falls 35 A from the wear dimension of 0 mm in the embodiment shown in FIG. 7). After determining that the welding current has fallen below the predetermined lower limit current (S2 in FIG. 6), the control computer 7 detects wear of the power supply portion 10a of the contact tip 10 (S3 in FIG. 6) and outputs an alarm to the warning means so that the warning lamp 8 is lit, the warning speaker 9 issues a warning, or the like (S4 in FIG. 6). Note that the present invention is not limited to issuing a warning when wear of the power supply portion 10a of the contact tip 10 is detected. A control may be executed such that the welding process stops concurrently with the issue of warning.

The present invention uses a drop in the welding current caused by wear of the power supply portion 10a of the contact tip 10 to detect the wear of the power supply portion 10a based on the welding current. Therefore, even if the inner circumferential surface of the contact tip 10 approaches the outer circumferential surface of the wire guide 11, no spark is generated to adhere the two together. Also, because the contact tip 10 can be used until the wear limit is reached, it is possible to reduce the frequency with which the contact tip 10 is replaced. Consequently, the replacement cost of the contact tip 10 can be reduced, and there is less need to stop the welding process for replacement, or to inspect welding sites and repair any defects found. Therefore, productivity can be improved.

The invention claimed is:

1. An arc-welding torch including: a contact tip having, on a distal-end inner circumferential surface thereof, a power supply portion that contacts a fed welding wire to supply current; and a wire guide that is provided having a predetermined clearance within the contact tip and guides the fed welding wire, wherein the arc-welding torch is configured such that axes of the contact tip and the wire guide are relatively changed so as to cause the welding wire guided by the wire guide to contact the power supply portion of the contact tip, wherein, in the arc-welding torch, the power supply portion of the contact tip is formed to have an axial length with which a welding current is maintained at least a predetermined lower limit current despite a shift of a power supply point in accordance with wear of the power supply portion.

2. The arc-welding torch according to claim 1, wherein the axial length of the power supply portion of the contact tip is 1.5 to 3.0 mm.

3. An arc-welding torch including: a contact tip having, on a distal-end inner circumferential surface thereof, a power supply portion that contacts a fed welding wire to supply current; and a wire guide that is provided having a predetermined clearance within the contact tip and guides the fed welding wire, wherein the arc-welding torch is configured such that axes of the contact tip and the wire guide are relatively changed so as to cause the welding wire guided by the wire guide to contact the power supply portion of the contact tip, the arc-welding torch comprising a wear-contact portion where the wear contact portion is provided rearward of the power supply portion on an inner circumferential surface of the contact tip and has an inner diameter larger than the one of the power supply portion so as to contact the welding wire at a wear limit before a spark generates as an outer circumferential surface of the wire guide approaches an inner circumferential surface of the contact tip when the power supply portion has worn, and the wear-contact portion also has an axial length allowing that welding current falls below a predetermined lower limit current when a power supply point shifts rearward.

4. The arc-welding torch according to claim 3, wherein the power supply portion of the contact tip is formed to have an axial length with which a welding current is maintained at least a predetermined lower limit current despite a shift of a power supply point in accordance with wear of the power supply portion.

5. The arc-welding torch according to claim 4, wherein the axial length of the power supply portion of the contact tip is 1.5 to 3.0 mm.

6. The arc-welding torch according to claim 3 further comprising:
   a current detection device that detects current supplied to the contact tip; and
   a determination device that determines, when current detected by the current detection device has been detected as falling below a predetermined lower limit, that the welding wire contacts the wear-contact portion and the power supply portion of the contact tip has worn.

7. A wear detection system for a power supply portion of a contact tip of an arc-welding torch, the arc-welding torch including: a contact tip having, on a distal-end inner circumferential surface thereof, a power supply portion that contacts a fed welding wire to supply current; and a wire guide that is provided having a predetermined clearance within the contact tip and guides the fed welding wire, wherein the arc-welding torch is configured such that axes of the contact tip and the wire guide are relatively changed so as to cause the welding wire guided by the wire guide to contact the power supply portion of the contact tip, the wear detection system comprising:
   a wear-contact portion where the wear contact portion is provided rearward of the power supply portion on the inner circumferential surface of the contact tip and has an inner diameter larger than the one of the power supply portion so as to contact the welding wire at a wear limit before a spark generates as an outer circumferential surface of the wire guide approaches an inner circumferential surface of the contact tip when the power supply portion has worn, and the wear-contact portion also has an axial length allowing that welding current falls below a predetermined lower limit current when a power supply point shifts rearward;
   a current detection device that detects current supplied to the contact tip; and
   a determination device that determines, when current detected by the current detection device has been detected as falling below a predetermined lower limit, that the welding wire contacts the wear-contact portion and the power supply portion of the contact tip has worn.

8. A wear detection method for a power supply portion of a contact tip in an arc-welding torch, the arc-welding torch including: a contact tip having, on a distal-end inner circumferential surface thereof, a power supply portion that contacts a fed welding wire to supply current; and a wire guide that is provided having a predetermined clearance within the contact tip and guides the fed welding wire, wherein the arc-welding torch is configured such that axes of the contact tip and the wire guide are relatively changed so as to cause the welding wire guided by the wire guide to contact the power supply portion of the contact tip, the wear detection method comprising:
   forming a wear-contact portion where the wear contact portion is provided rearward of the power supply portion that contacts the welding wire of the contact tip and has an inner diameter larger than the one of the power supply portion so as to contact the welding wire at a wear limit before a spark generates as an outer circumferential surface of the wire guide approaches an inner circumferential surface of the contact tip when the power supply portion has worn, and the wear-contact portion also has an axial length allowing that welding current falls below a predetermined lower limit current when a power supply point shifts rearward;
   detecting current supplied to the contact tip; and
   that the power supply portion of the contact tip has worn when current detected had fallen below a predetermined lower limit.

* * * * *